(12) United States Patent
Hirano

(10) Patent No.: US 11,966,644 B2
(45) Date of Patent: Apr. 23, 2024

(54) PRINTING APPARATUS THAT STORES USER IDENTIFICATION INFORMATION, PRINTING SYSTEM, PRINTING CONTROL METHOD, AND MEDIUM

(71) Applicant: CANON KABUSHIKI KAISHA, Tokyo (JP)

(72) Inventor: Tsubasa Hirano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/311,526

(22) Filed: May 3, 2023

(65) Prior Publication Data

US 2023/0409259 A1    Dec. 21, 2023

(30) Foreign Application Priority Data

Jun. 15, 2022 (JP) ................................. 2022-096755

(51) Int. Cl.
*G06F 3/12* (2006.01)

(52) U.S. Cl.
CPC .......... *G06F 3/1253* (2013.01); *G06F 3/1203* (2013.01)

(58) Field of Classification Search
None
See application file for complete search history.

(56) References Cited

U.S. PATENT DOCUMENTS

| | | | |
|---|---|---|---|
| 8,675,234 B2 | 3/2014 | Sato | |
| 2017/0078530 A1* | 3/2017 | Adachi | H04N 1/00408 |
| 2018/0376015 A1* | 12/2018 | Hokiyama | H04N 1/00514 |
| 2019/0220237 A1* | 7/2019 | Maeda | G06F 3/1253 |
| 2020/0233619 A1* | 7/2020 | Hosoda | G06F 3/1239 |
| 2020/0364010 A1* | 11/2020 | Inoue | G06F 3/1203 |
| 2021/0042071 A1* | 2/2021 | Sako | G06F 3/1203 |
| 2022/0308803 A1* | 9/2022 | Hasama | G06F 3/1288 |
| 2022/0308806 A1* | 9/2022 | Kawasaki | G06F 3/1206 |
| 2022/0317953 A1* | 10/2022 | Terashima | G06F 3/1287 |

FOREIGN PATENT DOCUMENTS

| | | |
|---|---|---|
| JP | 2003288327 A | 10/2003 |
| JP | 2012133489 A | 7/2012 |

* cited by examiner

*Primary Examiner* — Henok Shiferaw
(74) *Attorney, Agent, or Firm* — ROSSI, KIMMS & McDOWELL LLP

(57) ABSTRACT

A printing apparatus is provided. The apparatus stores user identification information of a registered user in a storage, obtains a print job including user information of an owner of the print job from a printing service system. When the print job obtained is a first print job in which the owner of the print job obtained does not correspond to the user identification information stored in the storage and is obtained from the printing service system, the apparatus executes the print job according to a setting for allowing or denying printing using the first print job and performs printing via a printing unit.

10 Claims, 10 Drawing Sheets

FIG. 5A

LIST OF USERS WHO HAVE REGISTERED
TO CLOUD PRINTING SERVICE

| ACCOUNT | USER NAME | USER TYPE | USE OF PRINTING SERVICE |
|---|---|---|---|
| userA@hicrosoft.com | userA | AUTHORIZED | ALLOWED |
| userB@hicrosoft.com | userB | AUTHORIZED | DENIED |
| guestA@poogle.com | guestA | GUEST | ALLOWED |
| guestB@conon.com | guestB | GUEST | DENIED |

LIST OF USERS WHO HAVE REGISTERED
TO PRINTING APPARATUS

| USER NAME | CLOUD ACCOUNT |
|---|---|
| userA | userA@hicrosoft.com |
| userB | userB@hicrosoft.com |
| userC | - |
| userD | - |

502

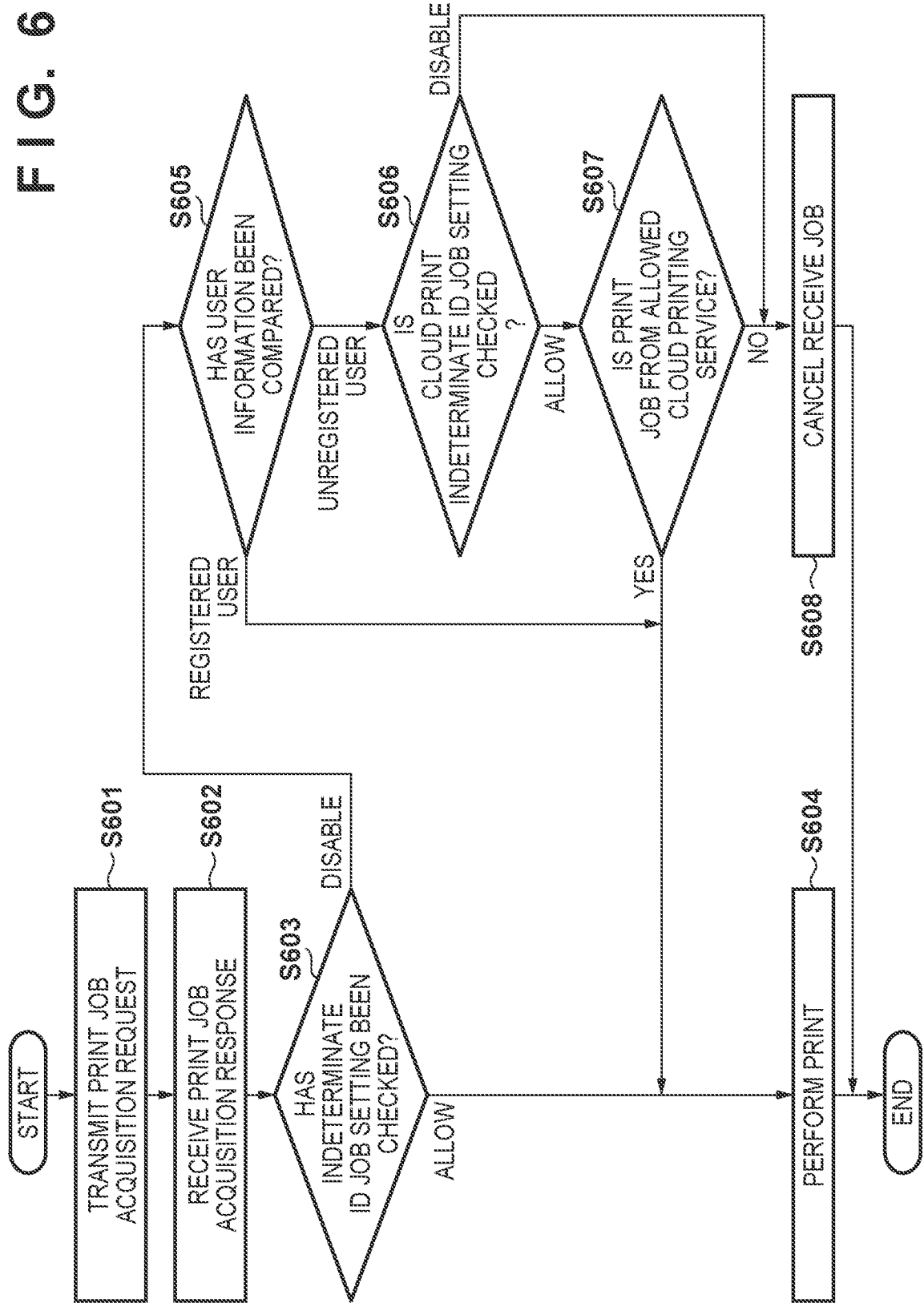

FIG. 7A

```
JOB OBTAINING REQUEST PACKET

Operation : Fetch-Job Request
Attribute:
  job-id=1
```

FIG. 7B

```
JOB OBTAINING RESPONSE PACKET
(WHEN IT IS AUTHORIZED USER)
Operation : Fetch-Job Response
Status code : successful-ok
Attribute:
  job-id = 1
  job-uuid = urn:uuid:ce027bf-4d49-32c3-47db-054116c684fb
  job-name = test.pdf
  job-originating-user-name : userA
  job-originating-user-uri : userA@hicrosoft.com
  copies = 1
  number-up = 1
  color-mode = color
```

FIG. 7C

```
JOB OBTAINING RESPONSE PACKET(WHEN IT IS GUEST USER)

Operation : Fetch-job Response
Status code : successful-ok
Attribute:
  job-id = 1
  job-uuid = urn:uuid:ce027bf-4d49-32c3-47db-054116c684fb
  job-name = test.pdf
  job-originating-user-name : guestA
  job-originating-user-uri : guestA@moogle.com
  copies = 1
  number-up = 1
  color-mode = color
```

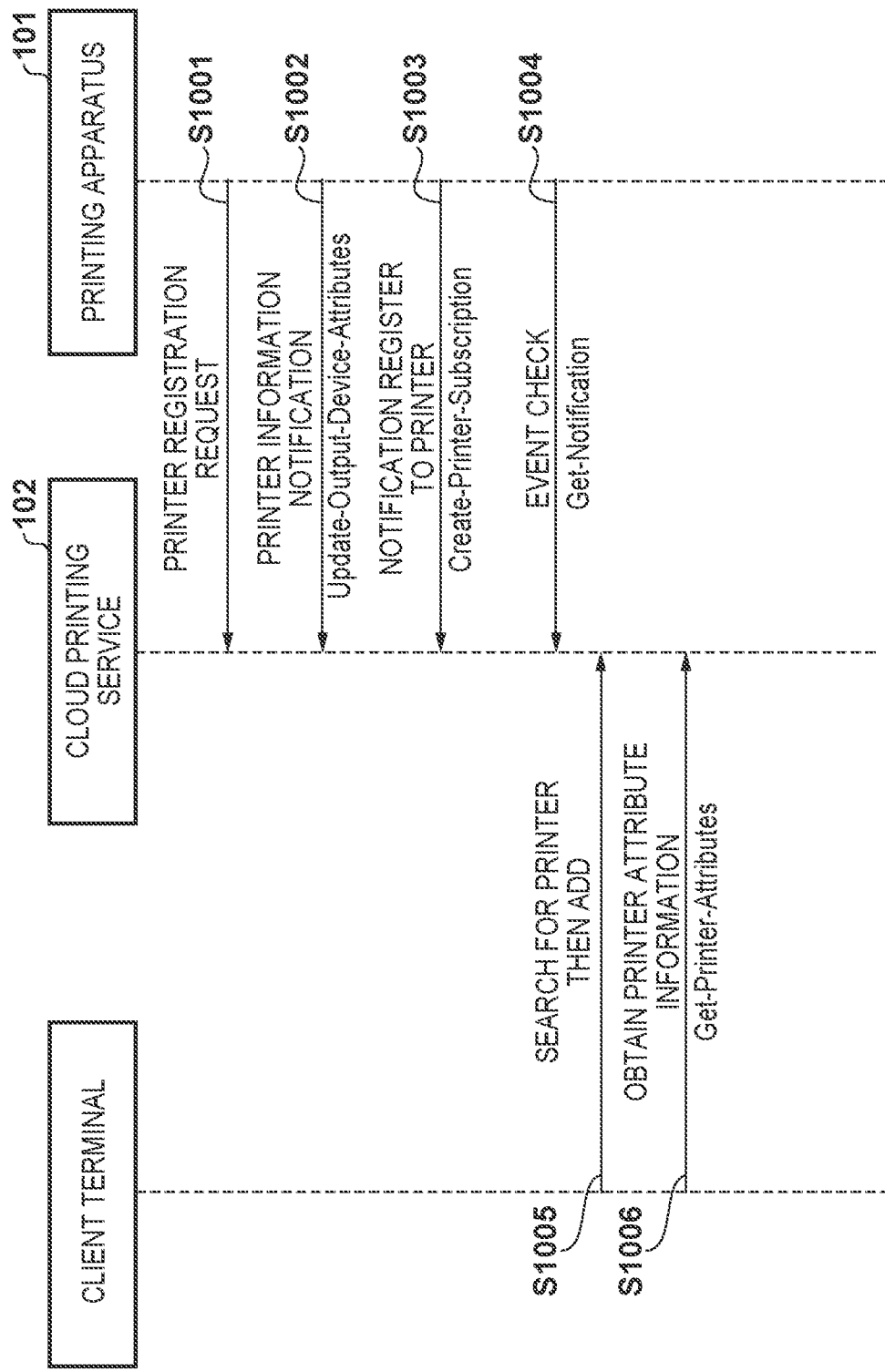

PRINTING APPARATUS THAT STORES USER IDENTIFICATION INFORMATION, PRINTING SYSTEM, PRINTING CONTROL METHOD, AND MEDIUM

BACKGROUND OF THE INVENTION

Field of the Invention

The present invention relates to a printing apparatus that receives a print job from an external source, a printing system, a printing control method, and a medium.

Description of the Related Art

Printing apparatuses with a user management function are becoming more common. A user management function includes a login function for registering user information in the printing apparatus in advance and allowing the user to use the printing apparatus after logging in, a restriction function for restricting the functions that can be used by the user, and the like. An example of the restriction function is a function for allowing or prohibiting printing depending on the print job and the received user information when the user performs printing. By using this function, a print job for a user registered in the printing apparatus can be performed with restriction, but a print job of an unregistered user can be prohibited from being performed, for example. The print job of a user not registered in the printing apparatus is treated as an indeterminate ID job, and by setting the performance of indeterminate ID jobs to be prohibited, such print jobs are deleted without being performed. Alternatively, depending on the settings of the printing apparatus, indeterminate ID jobs may be stored in an indeterminate ID job storage inside the printing apparatus. This kind of user management function helps prevent printing by users not registered in the printing apparatus and can ensure security. A known example of this includes a method of not allowing printing by a third party described in Japanese Patent Laid-Open No. 2003-288327.

Cloud printing systems in which a print job is supplied via the cloud and transmitted to a printing apparatus are also becoming more common (Japanese Patent Laid-Open No. 2012-133489). In such a printing system, first, an administrator registers a printing apparatus in a cloud printing service (hereinafter, also referred to as CPS) to which the administrator belongs to. Thereafter, the user who is allowed to use the CPS uses client terminals, selects a printer registered in the CPS as an output printer, sets the desired print settings, and transmits a print job to the CPS. After receiving the print job, the CPS transfers the print job to the printing apparatus. The printing apparatus performs printing based on the transferred print job. In particular, for cloud printing systems using the Internet Printer Protocol (IPP), PWG5100.18, RFC3995, RFC3996, and the like are defined.

However, some cloud services provide a system in which a guest user not registered in the cloud service is allowed to temporarily use the cloud service. For example, the administrator of the CPS can allow a guest user to use the CPS. In this case, the owner name (name of creator) of the print job corresponds to the account and user name of the guest user. Typically, in cloud printing, the CPS side user and the printing apparatus user are associated together when the printing apparatus is registered in the CPS. However, since the CPS guest user is not registered in the printing apparatus, the user cannot be identified. Thus, print jobs from a guest user are treated as indeterminate ID jobs in the printing apparatus. However, this creates a problem in which, though the guest user can print using the CPS, because the printing apparatus is set to prohibit the printing of indeterminate ID jobs, the print job of the guest user is determined to be an indeterminate ID job and not printed.

SUMMARY OF THE INVENTION

The present invention provides a system for a printing apparatus that can perform printing for a guest user allowed to print by the CPS.

The present invention has the following configuration. The present invention in its first aspect provides a printing apparatus comprising: at least one memory storing at least one program; and at least one processor, wherein the at least one program causes the at least one processor to: store user identification information of a registered user in a storage, obtain a print job including user information of an owner of the print job from a printing service system, and when the print job obtained is a first print job in which the owner of the print job obtained does not correspond to the user identification information stored in the storage and is obtained from the printing service system, execute the print job according to a setting for allowing or denying printing using the first print job and perform printing via a printing unit.

The present invention in its second aspect provides a printing system comprising: a printing apparatus; a printing service system; and a client terminal that supplies a print job to the printing service system, wherein the printing apparatus includes at least one memory storing at least one program, and at least one processor, wherein the at least one program causes the at least one processor to: store user identification information of a registered user in a storage, obtain a print job including user information of an owner of the print job from the printing service system, and when the print job obtained is a first print job in which the owner of the print job obtained does not correspond to the user identification information stored in the storage and is obtained from the printing service system, execute the print job according to a setting for allowing or denying printing using the first print job and perform printing via a printing unit.

According to the present invention, a system for a printing apparatus can perform printing for a guest user allowed to print by the CPS.

Further features of the present invention will become apparent from the following description of exemplary embodiments with reference to the attached drawings.

BRIEF DESCRIPTION OF THE DRAWINGS

FIGS. 5A and 5B are diagrams for describing a user account list.

FIG. 6 is a diagram illustrating an example of a flowchart for when a print job is received according to the first embodiment.

FIGS. 7A, 7B, and 7C are diagrams illustrating examples of packets used by the printing apparatus to obtain a print job.

FIG. 10 is a diagram illustrating an example of a sequence for cloud printing using IPP.

DESCRIPTION OF THE EMBODIMENTS

Figure 1:
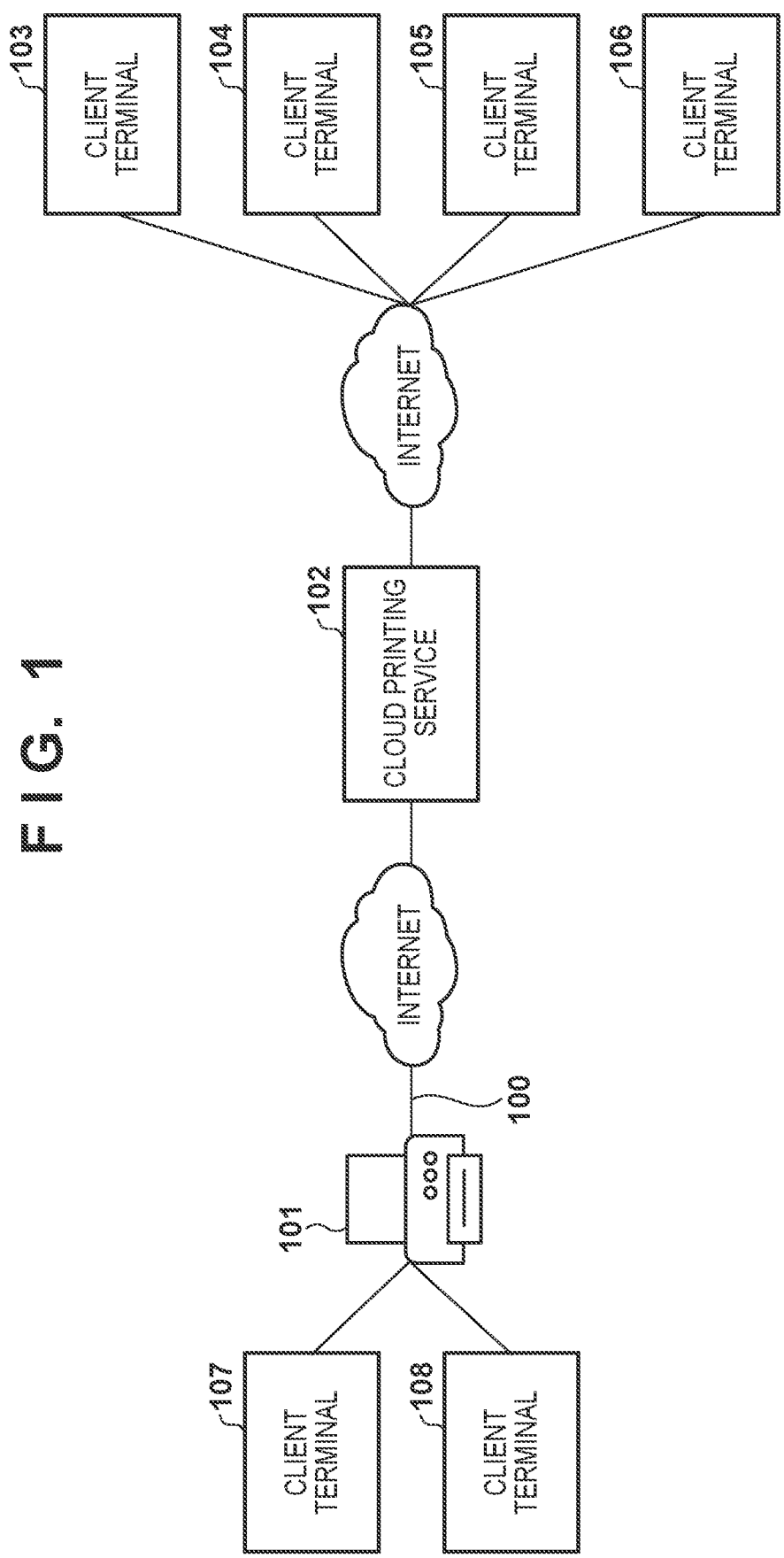
FIG. 1 is a diagram illustrating an example of a printing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

First, the configuration of a printing system according to the present invention will be described using FIG. 1. A printing system according to the present embodiment includes a printing apparatus 101, client terminals 103 to 108, and a cloud printing service (hereinafter, also referred to as CPS or printing service system) 102. The printing apparatus 101 communicates with the CPS 102 and the client terminals 107 and 108 on the Internet via a network 100. The network 100, for example, may be constituted of a combination of a communication network such as LAN and WAN, a cellular network (for example, LTE, 5G, and the like), a wireless network compliant with IEEE 802.11, and the like. In other words, it is sufficient that the network 100 can transmit and receive data, and any method may be used for the physical layer communication method. The client terminals 103 to 106 also communicate with the CPS 102 on the Internet via a communication network or a cellular network.

The printing apparatus 101 includes a scan function for transmitting data based on an image obtained by reading using a scanner to an external apparatus, a print function for printing an image on a sheet such as paper on the basis of a print job received from an external apparatus, and a copy function. Also, the printing apparatus 101 receives print jobs via the CPS 102 and can perform printing. In the present embodiment, a Multi Function Peripheral (MFP) with a plurality of functions is used as an example of a printing apparatus, but no such limitation is intended. For example, a Single Function Peripheral (SFP) with a single function such as only a print function or the like may be used. Also, in the present embodiment, printing onto a sheet such as paper is used as an example, but no such limitation is intended. The present embodiment can be applied to a print control for 3D printing or the like that forms a three-dimensional article based on three-dimensional shape data. Note that the printing apparatus may also be referred to as an image forming apparatus.

Also, the printing apparatus 101 according to the present embodiment includes a user management function. This provides function restricting for registering user information into the printing apparatus 101 in advance and restricting the functions used by a user and a login function used by a user to log into the printing apparatus.

The CPS 102 receives a print job from one client terminal from among the client terminals 103 to 106 and stores the print job. Then, the printing apparatus 101 registered in the CPS 102 is notified of the input print job. After receiving the notification, the printing apparatus 101 obtains the print job and executes printing processing. The CPS 102 is constituted by one or more information processing apparatuses. When the CPS 102 is constituted by a plurality of information processing apparatuses, the functions may be distributed into user authentication, print data provision, and the like; the load of one function may be distributed; or a combination thereof may be used. Also, the client terminals 103 will be used as a representative for the client terminals 103 to 106.

FIG. 5A is a diagram illustrating an example of a list of user accounts registered in the cloud printing service. The user identification information includes authorized users registered in the cloud printing service, user A and user B. However, in this example, the cloud printing service administrator has set user A to be allowed to use the cloud printing service and user B to be not allowed to use the cloud printing service. Also, guest user A and guest user B are users not registered in the cloud printing service. In this example, the cloud printing service administrator has set guest user A to be allowed to use the cloud printing service and guest user B to be not allowed to use the cloud printing service.

The user identification information of user A and user B is registered in the printing apparatus as illustrated in FIG. 5B, and the CPS user account, in other words, the user information, is associated with the user identification information and registered. Users other than the registered users are treated as indeterminate ID users. In this case, when the guest user A who is allowed to use the cloud printing service uses the cloud printing service and transmits a print job, the guest user A is treated as an indeterminate ID user in the printing apparatus. Thus, according to the existing "indeterminate ID job processing settings", "cannot print" is determined, and the print job is canceled.

In this manner, this creates a problem in which, though the guest user can print using the CPS, when the printing apparatus is set to discard the indeterminate ID job, the print job of the guest user is determined to be an indeterminate ID job and not printed.

The present embodiment has been made in consideration of at least one these problems and realizes a system in which a setting is added for allowing or discarding printing of indeterminate ID jobs for a guest user of the CPS and allowing printing for a guest user authorize for printing in the CPS. This will be described in detail below.

Printing Apparatus 101 Hardware Configuration

Figure 3:
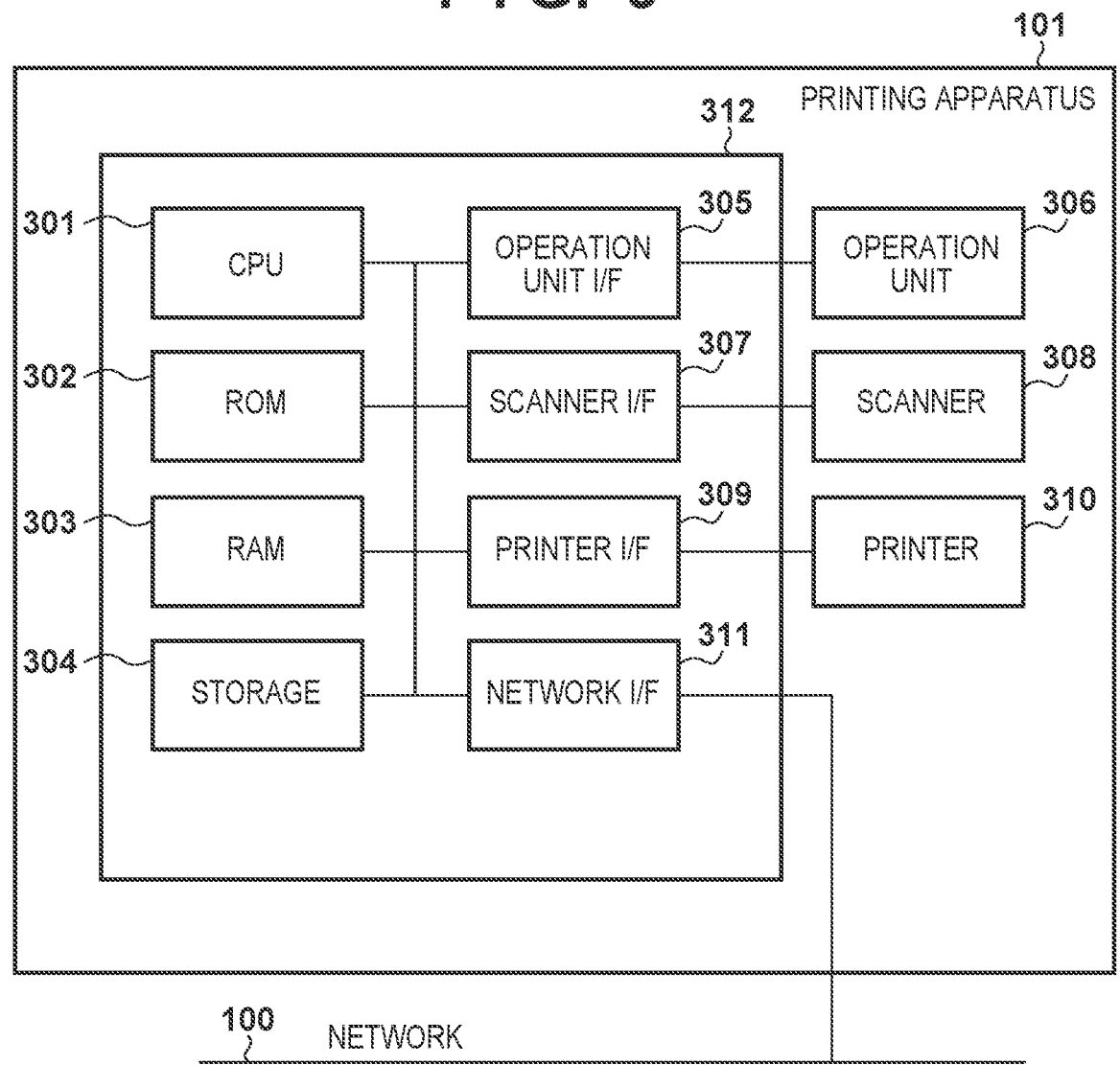
FIG. 3 is a diagram illustrating an example of the hardware configuration of a printing apparatus.

The hardware configuration of the printing apparatus 101 according to the present embodiment will be described using FIG. 3. FIG. 3 is a block diagram illustrating the hardware configuration of the printing apparatus 101. The printing apparatus 101 includes a read function for reading an image on a sheet, a file transmitting function enabling a read image to be transmitted to an external communication apparatus, and the like. A print function for printing an image on a sheet is also provided. Also, a function for receiving a print job from the CPS 102 and printing the print job, the user management function described above, and a hold printing function is provided.

A control unit 312 including a central processing unit (CPU) 301 controls the overall operations of the printing apparatus 101. The CPU 301 controls the overall operations of the printing apparatus 101. The CPU 301 reads out and executes a control program stored in a Read Only Memory (ROM) 302 or the storage 304 and executes various types of control including print control and read control. The ROM 302 stores a control program executable by the CPU 301. A Random Access Memory (RAM) 303 is a main storage memory that the CPU 301 accesses and is used as a working area or temporary storage region to load various control programs. The storage 304 stores print jobs, image data, various programs, and various settings information. Print jobs and other information downloaded from the CPS 102 are also stored in the storage 304. In this manner, the hardware including the CPU 301, the ROM 302, the RAM 303, storage 304, and the like constitute a so-called computer.

Note that in the printing apparatus 101 of the present embodiment, one CPU 301 uses one memory (the RAM 303) to execute the processing illustrated in the flowchart described below. However, other configurations may be used. For example, a plurality of processors, memories, and storages may be configured to cooperate to execute the processing illustrated in the flowchart described below. Also, a portion of the processing may be executed using a hardware circuit.

A scanner I/F 307 connects a scanner 308 and the control unit 312. The scanner 308 reads a document placed on the not-illustrated platen and generates image data. The image data generated by the scanner 308 may be printed at a printer 310, stored in the storage 304, and transmitted to an external apparatus via a network I/F 311.

The printer 310 prints an image on a sheet fed from a not-illustrated feed cassette on the basis of an input print image and print control command. The printing method may be an electrophotographic method in which toner is transferred and fixed to paper or an inkjet method in which printing is performed by discharging ink on paper.

An operation unit I/F 305 connects an operation unit 306 and the control unit 312. The operation unit 306 is provided with a liquid crystal display unit with a touch panel function, various types of hard keys, or the like. The operation unit 306 functions as a display unit that displays information to a user and a reception unit that receives user instructions. In other words, the operation unit 306 provides the user interface of the printing apparatus 101. The CPU 301 cooperates with the operation unit 306 and performs information display control and user operation reception control.

The network I/F 311 is connected with a network cable and can perform communication with an external apparatus on the network 100 or the Internet. In the present embodiment, the network I/F 311 is used as an example of a communication interface that performs wired communication compliant with Ethernet (registered trademark). However, no such limitation is intended. For example, a wireless communication interface compliant with the IEEE 802.11 series may be used. Also, both may be wireless communication interfaces. Also, a communication interface that performs mobile communications including a 3G line such as CDMA, a 4G line such as LTE, 5G NR, or the like may be used.

In the present embodiment described herein, the printing apparatus 101 manages a database for managing user accounts, but no such limitation is intended. The management of the user accounts of the users that use the printing apparatus 101 can be implemented in cooperation with an external authentication server. For example, user accounts may be managed in cooperation with ActiveDirectory service or Azure (registered trademark) ActiveDirectory service provided by Microsoft (registered trademark).

Cloud Printing Service 102 and Client Terminal 103 Hardware Configuration

Figure 9:
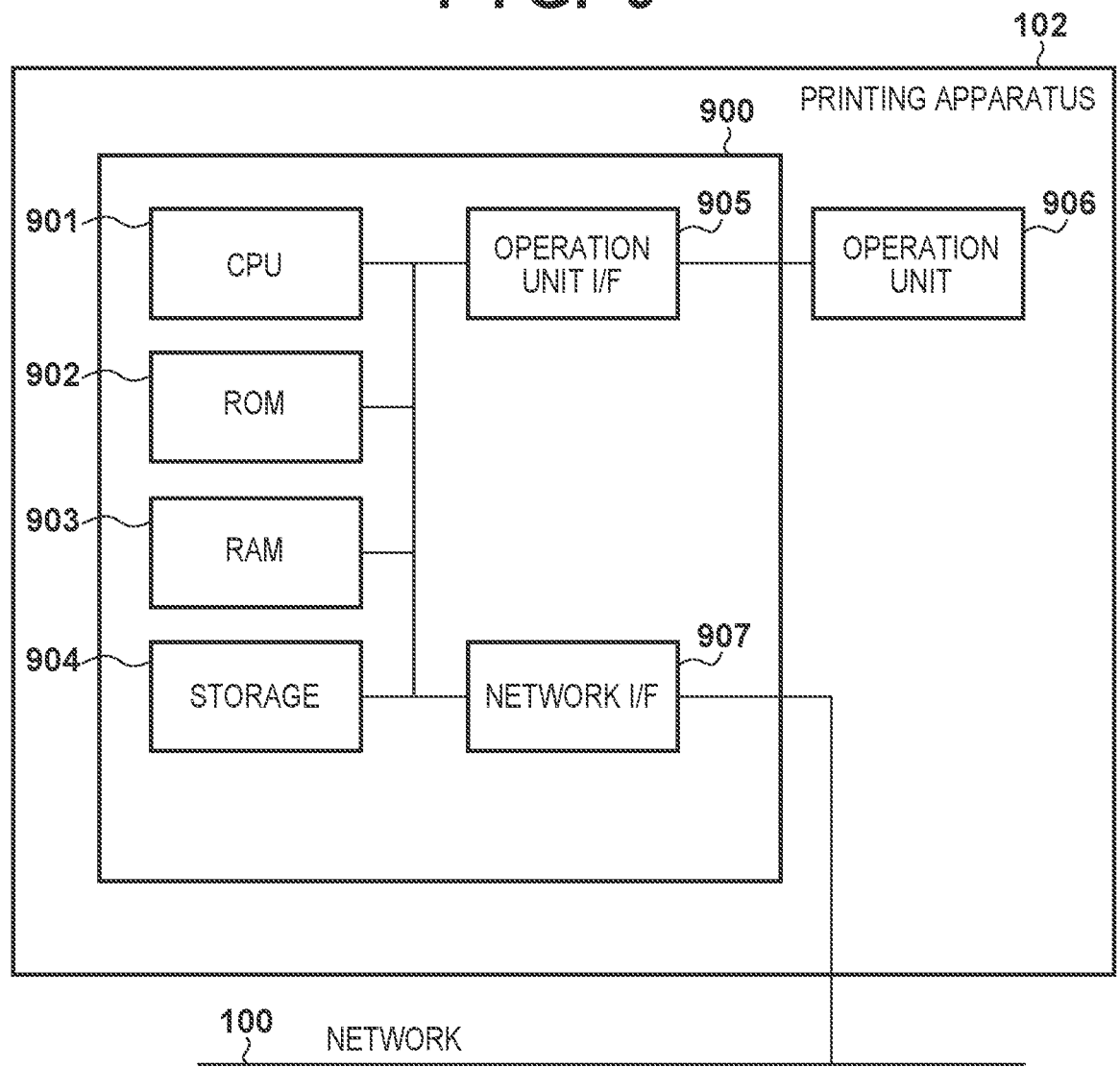
FIG. 9 is a diagram illustrating an example of the hardware configuration of a cloud printing service.

The hardware configuration of the cloud printing service 102 and the client terminal 103 according to the present embodiment are illustrated in FIG. 9.

A control unit 900 including a CPU 901 controls the entire operations of an information processing apparatus that executes the CPS 102. The CPU 901 controls the entire operations of the apparatus. The CPU 901 reads out and executes a control program stored in a ROM 902 or a storage 904 and executes various types of control including print control and read control. The ROM 902 stores a control program executable by the CPU 901. A RAM 903 is a main storage memory that the CPU 901 accesses and is used as a working area or temporary storage region to load various control programs. The storage 904 stores print jobs, image data, various programs, and various settings information. Print jobs and other information uploaded from the client terminal 103 are also stored in the storage 904. In this manner, the hardware including the CPU 901, the ROM 902, the RAM 903, storage 904, and the like constitute a so-called computer.

Note that in the CPS 102 of the present embodiment, one CPU 901 uses one memory (the RAM 903) to execute the processing. However, other configurations may be used. For example, a plurality of processors, memories, and storages may be configured to cooperate to execute the processing illustrated in the flowchart described below. Also, a portion of the processing may be executed using a hardware circuit.

An operation unit I/F 905 connects an operation unit 906 and the control unit 900. The operation unit 906 is provided with a liquid crystal display unit with a touch panel function, a keyboard, a pointing device, or the like. The operation unit 906 functions as a display unit that displays information to a user and a reception unit that receives user instructions. In other words, the operation unit 906 provides a user interface. The CPU 901 cooperates with the operation unit 906 and performs information display control and user operation reception control.

A network I/F 907 is connected with a network cable and can perform communication with an external apparatus on the network 100 or the Internet. In the present embodiment, the network I/F 907 is used as an example of a communication interface that performs wired communication compliant with Ethernet (registered trademark). However, no such limitation is intended.

Print Job Registration

The process by the printing system described above until printing can be performed will now be described. FIG. 10 is an example sequence diagram illustrating the process of a cloud printing system using IPP and in particular the process from registering a printing apparatus until the printing apparatus registered can be used from a client terminal.

First, a printer registration request is transmitted to the CPS 102 via an operation of the printing apparatus 101 (step S1001). This operation may be performed by the operation unit 306 of the printing apparatus 101, but may also be performed by a remote UI provided by the printing apparatus 101 on a computer or the like. Thereafter, the printing apparatus 101 uses an Update-Output-Device-Attributes operation to notify the CPS 102 of the supported attribute information and attribute value (step S1002). In this manner, the attribute value of the printing apparatus 101 is registered in the CPS 102. The attribute value of the printing apparatus 101 includes whether or not PIN printing, which is a password-protected print job, is supported and the like, for example.

Thereafter, the printing apparatus 101 uses a Create-Printer-Subscription operation to register an event notification in the CPS 102 (step S1003). After the notification registration, the printing apparatus 101 uses the Get-Notification operation to check whether or not an event has occurred (step S1004). Accordingly, when a new event, such as registration of a print job to be executed by the printing apparatus 101, occurs, the CPS 102 notifies the printing apparatus 101 of the event. Adding a printing apparatus to the CPS 102 that executes the process described above should be performed before cloud printing using the printing apparatus 101.

The client terminal 103 searches for a printing apparatus registered in the CPS 102 and adds a printing apparatus selected from the search results as a printing apparatus to be used by the client terminal 103 (step S1005). Then, the attribute information and the attribute values of the added printing apparatus are obtained from the CPS 102 using the Get-Printer-Attributes operation (step S1006). The attribute information and the attribute values of the obtained printing apparatus should be associated with the registered printing apparatus and stored. Here, a user registered in the CPS 102 is associated with a user registered in the printing apparatus 101 and stored in the printing apparatus 101. For example, the printing apparatus 101 obtains the user information of the CPS 102 belonging to the same tenant, determines whether the user name of the user of the printing apparatus 101 is the same, and associates together the users determined to be the same. Alternatively, a management user may perform association by checking the user of the CPS 102 to be associated against a registered user of the printing apparatus 101.

FIGS. 5A and 5B are diagrams illustrating examples of user information. FIG. 5A illustrates an example of user information 501 registered in the CPS 102, and FIG. 5B illustrates an example of user information 502 registered in the printing apparatus 101. The user information 501, which includes the user name, user type, and whether or not the printing service (cloud printing service) can be used, is associated with a user account and registered in the CPS 102. Also, the user information 502, which includes the user information (cloud account) of the CPS 102 associated with the user name registered in the printing apparatus 101 via the association described above, is stored in the printing apparatus 101. In the example in FIG. 5B, the user name of the printing apparatus 101, User A, is associated with the account with same title, User A, and registered. Accordingly, User A of the printing apparatus 101 can access the CPS 102 using the account "userA@hicrosoft.com" and can obtain a print job. Note that when user authentication is required, the input of a password or the like is requested, but authentication can also be easily implemented by storing a token (also referred to as authorization information) issued by an authentication server when authentication has been completed once.

Thereafter, when performing printing, the client terminal 103 selects the printing apparatus added in steps S1005 and S1006, and printing can be performed using the selected printing apparatus. For printing, when the printing apparatus selected at the client terminal 103 is the printing apparatus 101 registered in the CPS 102, a print settings screen is displayed according to the obtained attribute information, and the print job together with the set printing attributes are transmitted to the CPS 102. Note that the attribute information of the printing apparatus may also be referred to as print settings.

Cloud Printing Sequence According to First Embodiment

Figure 4A:
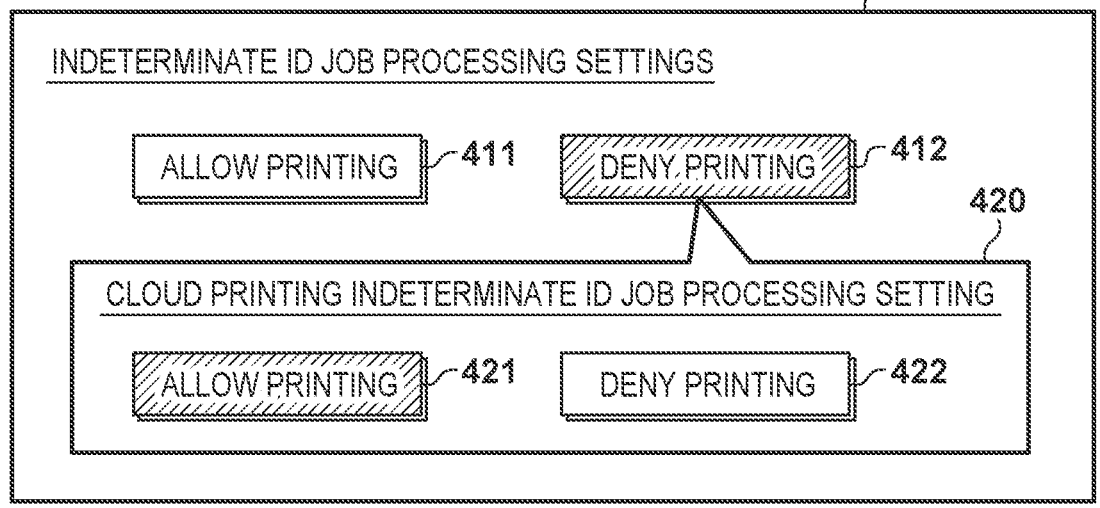
FIGS. 4A and 4B are diagrams illustrating examples of settings screens displayed on an operation unit of the printing apparatus.

Next, a cloud printing sequence according to the present embodiment will be described using FIG. 2. However, before this description, an example of a settings screen of the printing apparatus 101 will be given. FIG. 4A is a diagram illustrating an example of a user interface for indeterminate ID job processing settings displayed on the operation unit 306. An allow printing button 411 and a deny printing button 412 are displayed on a settings screen 410. In the state illustrated in the diagram, the deny printing button 412 is selected. This setting is stored in the storage 304 or the like as part of the settings information of the printing apparatus 101 and referenced in the process illustrated in FIG. 2.

When the deny printing button 412 is set, a cloud printing indeterminate ID job processing settings screen 420 is displayed for an exception. An allow printing button 421 and a deny printing button 422 are displayed on the settings screen 420. In the state illustrated in FIGS. 4A and 4B, the allow printing button 421 is selected. This setting is stored in the storage 304 or the like as part of the settings information of the printing apparatus 101 and referenced in the process illustrated in FIG. 2. The cloud printing indeterminate ID job processing setting is a setting for allowing processing for a cloud printing indeterminate ID job as an exception even when deny printing is set for the indeterminate ID job processing setting. When allow printing is set for the cloud printing indeterminate ID job, the settings can be set so that printing for an indeterminate ID job obtained from cloud printing is allowed, but printing for other indeterminate ID jobs is not allowed.

Figure 4B:
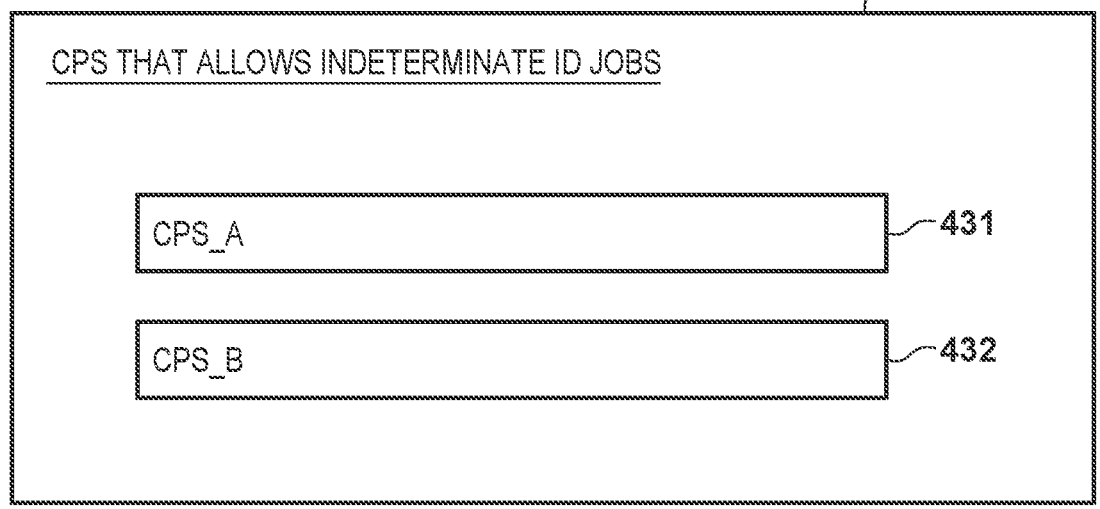

Also, in a case in which the cloud printing indeterminate ID job processing setting is set to allow printing, identification information of the cloud printing service that allows printing of indeterminate ID jobs is registered. An example of a screen 430 for this is illustrated in FIG. 4B. In other words, when the indeterminate ID job processing setting is deny printing and the cloud printing service indeterminate ID job processing setting is allow printing, printing is allowed for print jobs from the CPSs set on the screen 430. The identification information of the CPSs set here are also stored in the storage 304 or the like.

Figure 2:
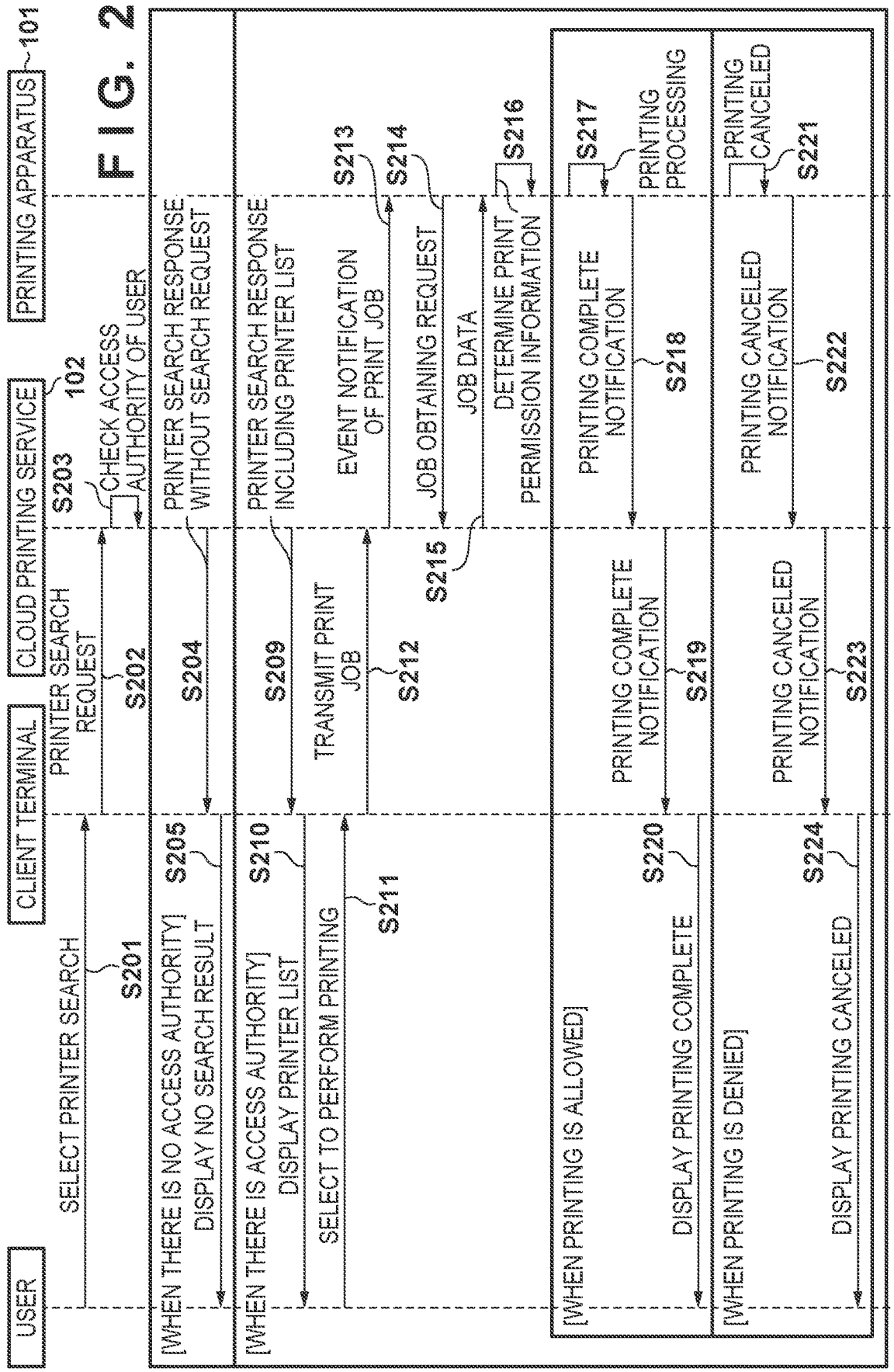
FIG. 2 is a diagram illustrating an example of a transmitting and receiving sequence for a print job according to a first embodiment.

In the process of the cloud printing illustrated in FIG. 2, first, a printer search is selected from the client terminal (step S201) and, in response, a printer search request including the user information is transmitted by the client terminal to the CPS 102 (step S202). The user information may be the user name or user ID, or a user token obtained when the user previously logged in to use the CPS may be used.

When the CPS 102 receives the printer search request, the CPS 102 uses the user information registered into the CPS 102 in FIG. 5A and the user information received from the client terminal to check the access authority (privilege) of the user regarding printer use (step S203). Accordingly, it is determined whether or not there is an account of the user information received from the client terminal 103 in the list of users registered in the CPS 102. When there is no account of the corresponding user information in the user list, it is determined to deny use of the printing service. When there is an account of the corresponding user information in the user list and the printing service use information is "allow", it is determined to allow use of the printing service. On the other hand, when the printing service use information is "deny", it is determined to deny use of the printing service.

In this manner, when the users having performed a print request are user B and guest B, the CPS 102 determines that the user is not authorized to use the printer, and the CPS 102 responds, indicating that there are no usable printers (step S204). Then, the client terminal receives the response and displays to the client that there are no usable printers (step S205).

On the other hand, when the users having performed a print request are user A and guest A, these are included in the user list and set to be allowed to use the printing service. Here, the CPS 102 determines that printing service use is allowed in step S203 and responds to the printer search including a list of usable printers (step S209). When the client terminal 103 receives the response, the client terminal 103 displays the printer list to the user (step S210). The user selects the desired printer from the printer list and, after setting the document to print and the print settings, selects to perform printing (step S211). Then, the client terminal 103 transmits the print job corresponding to the user settings (step S212).

When the CPS 102 receives the print job, the CPS 102 prepares the print job to be transmitted to the printing apparatus 101. When the preparation is complete, the job is issued with a job ID, and the printing apparatus 101 is notified of an event including the job ID indicating that the job can be obtained (step S213). When the printing apparatus 101 receives the event notification, the printing apparatus 101 sends a job obtaining request to the CPS 102 for the job (step S214). The job obtaining request holds the data indicated in the job obtaining request packet in FIG. 7A. Fetch-Job Request indicates a job obtaining request, job-id indicates the ID of the job to be obtained, and the CPS 102 determines the job information to respond with on the basis of this information.

Printing Processing for Authorized User

The operations after step S215 in the case of an authorized user, for example user A, performing printing will be described below. In response to the job obtaining request of step S214, the CPS 102 transmits job data including the document and the print settings to the printing apparatus 101 (step S215). Here, the job data to be transmitted holds data of the job obtaining response packet in FIG. 7B for a job of an authorized user, user A. Fetch-Job Response of the present data indicates the response to the job obtaining request, and StatusCode: Successful-ok indicates that the CPS 102 has normally executed processing of the job obtaining request. Also, job-originating-user-name stores the user name, and job-originating-user-uri stores a character string indicating the user account.

Thereafter, the printing apparatus 101 determines whether to allow or deny printing in response to the received job data (step S216). At this time, the printing apparatus 101 searches for a user with a registered cloud account that matches the job-originating-user-uri information "userA@hicrosoft.com" from the list of users registered in the printing apparatus 101 in FIG. 5B. Here, the printing apparatus 101 learns that the user user A with registered user identification information is performing the printing, or in other words is the transmission source or creator (also referred to as owner) of the print job. Thus, it is determined that printing is allowed. Then, the printing apparatus 101 executes printing processing of the job (step S217) and transmits a printing complete notification to the CPS 102 after printing is complete (step S218). Next, the CPS 102 transmits the printing complete notification to the client terminal (step S219). After receiving the printing complete notification, the client terminal displays to the client a display indicating printing is complete (step S220).

Printing Processing for Guest User

Next, the operations after step S215 in the case of a guest user, for example guest A, performing printing will be described below. In response to the job obtaining request of step S214, the CPS 102 transmits job data including the document and the print settings to the printing apparatus 101 (step S215). Here, the job data to be transmitted holds data of the job obtaining response packet in FIG. 7C for a job of a guest user, guest A. The packet includes user information, for example a user name, for the guest user. Thereafter, the printing apparatus 101 determines whether to allow or deny printing in response to the received job data (step S216).

Accordingly, the printing apparatus 101 searches for a user with a registered cloud account that matches the job-originating-user-uri information "guestA@microsoft.com" from the list of users registered in the printing apparatus 101 in FIG. 5B. Then, it is learned that the corresponding user information is not registered and a user not registered in the printing apparatus 101 is performing printing. At this time, the printing apparatus 101 determines that the print job is an indeterminate ID job. Then, it is determined whether the "indeterminate ID job processing setting" in FIG. 4A is "allow printing" and whether the "cloud printing indeterminate ID job processing setting" is "allow printing". In either case, since the job is a cloud printing indeterminate ID job, the printing apparatus 101 determines that the job can be executed and printing is allowed. Then, as with user A, the processing in the case of printing being allowed is executed, and printing can be completed (steps S217 to S220). Here, when the "indeterminate ID job processing setting" is "allow printing", printing is allowed regardless of which cloud printing service the print job has been obtained from. On the other hand, when the "indeterminate ID job processing setting" is "deny printing" and the "cloud printing indeterminate ID job processing setting" is "allow printing", only print jobs obtained from the cloud printing service with the identification information set on the screen 430 are allowed. For example, when the domain name of a CPS is registered on the screen 430, by comparing this domain name with the domain name of the user URI of the job source included in the job obtaining response, it can be determined whether or not the obtained print job is from a registered CPS.

On the other hand, when the "indeterminate ID job processing setting" is "deny printing" and the "cloud printing indeterminate ID job processing setting" is "deny printing", the printing apparatus 101 determines that the job cannot be printed. Then, the printing apparatus 101 executes cancel processing, in other words removal processing, on the job (step S221). When canceling is complete, the printing apparatus 101 transmits a printing canceled notification to the CPS 102 (step S222). Next, the CPS 102 transmits the printing canceled notification to the client terminal (step S223). After receiving the printing canceled notification, the client terminal displays to the client a display indicating that the job has been canceled (step S224).

Processing by Printing Apparatus 101 when Obtaining Print Job

A process of a printing control method executed by the printing apparatus 101 according to the present embodiment, in particular the operations when obtaining a print job executed by the CPU 301, will be described using FIG. 6. These operations correspond to the processing executed when an event of a print job occurring is received in step S213 in FIG. 2. When an event with a job is received from the CPS 102, the printing apparatus 101 starts this flow.

First, the printing apparatus 101 sends a job obtaining request to the CPS 102 (step S601) and receives print job data (step S602). Then, indeterminate ID job settings are checked (step S603), and when the "indeterminate ID job processing setting" indicated in FIG. 4A is "allow printing", printing of the job is performed (step S604), and the present flow ends. On the other hand, in step S603, when the "indeterminate ID job processing setting" is "deny printing", the user information of the user who supplied the job is compared with the user information registered in the printing apparatus and whether or not it is registered is determined (step S605). When it is registered, it is determined to allow printing, printing is performed (step S604), and the present flow ends.

Also, in step S605, when it is determined that the user who supplied the job is an unregistered user in the printing apparatus, the print job is determined to be an indeterminate ID job, and the "cloud printing indeterminate ID job" setting is checked (step S606). When this setting is "allow printing", it is determined whether or not the print job is from an allowed cloud printing service (step S607). In the case of YES, printing is performed (step S604), and the present flow ends. When it is determined that the print job is not allowed in step S607, the print job is canceled (step S608), and the present flow ends.

In a similar manner, in step S606, when the "cloud printing indeterminate ID job" setting is "deny printing", the received print job is canceled (step S608), and the present flow ends.

Here, as described using FIGS. 4A and 4B, when determining whether or not the print job is from an allowed cloud printing service in step S607, a setting that can be set by the administrator of the printing apparatus may be provided, and whether or not the print job is allowed may be determined according to the setting. Alternatively, the information of the cloud printing services supported by the printing apparatus 101 may be stored in advance. In this case, the cloud printing service is identified from the print job information, and whether or not to allow the print job is determined by confirming whether or not the cloud printing service is supported.

According to the embodiments described above, even when the printing apparatus is set to deny printing indeterminate ID jobs, a print job via cloud printing by a guest user allowed to use the CPS can be printed.

Note that in the embodiments described above, the user of the printing apparatus 101 is not particularly limited. In other words, the user may execute the print job obtained from the CPS 102 at the printing apparatus 101 without logging in. However, only a logged in user may be allowed to use the printing apparatus 101. In this case, a registered user may log in by entering the registered user information from the operation unit. Since the user of the printing apparatus 101 is associated with the user of the CPS 102, the logged in user of the printing apparatus 101 can execute only print jobs of the user associated with this user. In this case, a guest user of the printing apparatus 101 may be able to execute indeterminate ID jobs. At the printing apparatus 101, an operation unit for a guest user may be provided on a login screen, and a guest user may be allowed to log in by operating the operation unit.

Second Embodiment

In the second embodiment, in addition to the processing of the first embodiment, the printing apparatus 101 obtains, from the CPS 102, information indicating whether or not a guest job print setting is allowed and holds this as a setting of the printing apparatus 101. Note that the hardware configuration of the apparatuses in the second embodiment are similar to that in the first embodiment. The differences from the first embodiment will be described below.

Figure 8:
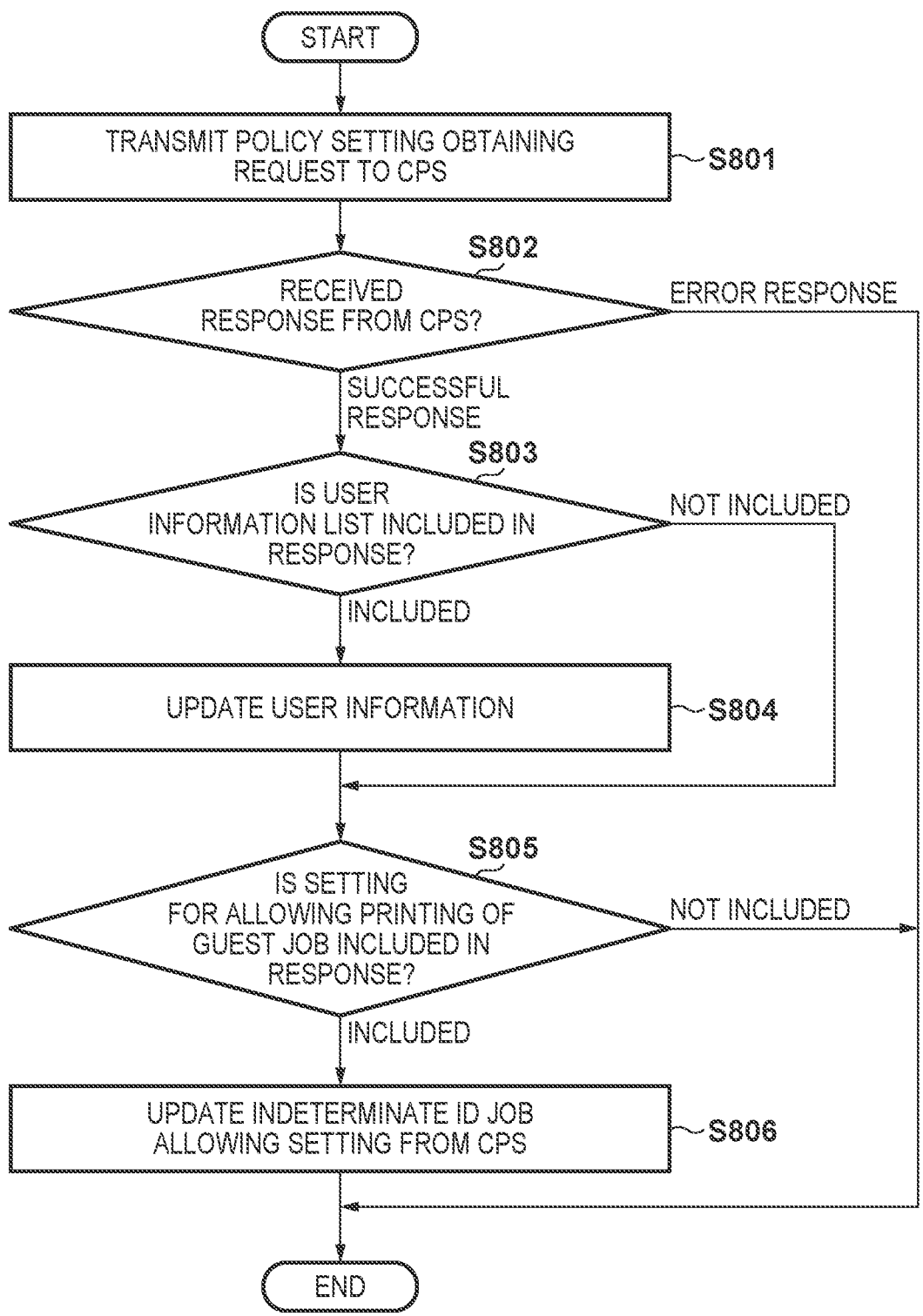
FIG. 8 is a diagram illustrating an example of a flowchart for obtaining settings information according to a second embodiment.

FIG. 8 is a diagram illustrating an example of a flowchart for describing the processing for the printing apparatus 101 to obtain, from the CPS 102, information indicating whether or not a guest job print setting is allowed and applying this to the settings of the printing apparatus 101. The present flow can be started regardless of whether or not there is a print request and can be started at intervals of a certain amount of time or started when there is a policy settings change notification from the CPS 102. Note that the process in FIG. 8 is executed by the CPU 301 of the printing apparatus 101.

The policy settings include information indicating whether or not printing by a guest user is allowed by the CPS 102. This information may be a portion of the policy information separately set by the administrator of the CPS 102 or may be information based on information, from among the information illustrated in FIG. 5A, indicating whether or not the printing service can be used by a user with a user type of guest. For example, when there is at least one guest user set to be allowed to use the printing service, information indicating that printing by guest users is allowed may be included in the policy information. On the other hand, when there are no guest users set to be allowed to use the printing service, information indicating that printing by guest users is not allowed may be included in the policy information.

When the present flow is started, the printing apparatus 101 transmits a policy settings obtaining request to the CPS 102 (step S801). When a response is received from the CPS 102 (step S802) and the response is a successful response, the processing proceeds to step S803. When the response is an error response, the present flow ends. An error response is sent when the CPS 102 cannot respond with a correct response or when the policy settings are not stored in the CPS 102, for example. Also, in the policy settings obtaining request, the printing apparatus may specify which settings are requested from among a user information list, guest job print settings, or the like. In this case, the CPS 102 responds with only the specified information.

When step S802 is a success, in the processing of step S803, it is determined whether or not the user information list is included in the response. When the user information list is included, the user information list is updated with the received user information list (step S804), and the processing proceeds to step S805. When the user information list is not included, the user information is not updated, and the processing proceeds to step S805. In the processing of step S805, it is determined whether or not a setting for allowing printing of a guest job is included in the response. When a setting for allowing printing of a guest job is included in the response, the "cloud printing indeterminate ID job" setting of the printing apparatus 101 is updated with the received settings (step S806), and the present flow ends. When a setting for allowing printing of a guest job is not included in the response, the setting is not updated, and the present flow ends. In step S806, when a printing processing by a guest user is allowed by the CPS 102, "cloud printing indeterminate ID job" is set to "allow". On the other hand, when a printing processing by a guest user is not allowed by the CPS 102, "cloud printing indeterminate ID job" is set to "deny".

Note that the CPS that allows indeterminate ID jobs set in the first embodiment is a CPS having obtained policy information in the present embodiment.

According to the embodiments described above, the policy settings of the printing apparatus can be automatically updated using the policy settings of the CPS 102.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-096755, filed Jun. 15, 2022 which is hereby incorporated by reference herein in its entirety.

What is claimed is:

1. A printing apparatus comprising:
at least one memory storing at least one program; and
at least one processor, wherein
the at least one program causes the at least one processor to:
store user identification information of a registered user in a storage,
obtain a print job including user information of an owner of the print job from a printing service system,
set a first setting indicating whether or not to allow printing by a print job in a case where an owner of the print job does not correspond to a user identification information stored in the storage;
set a second setting indicating whether or not to allow printing by the print job in a case where an owner of the print job obtained from the printing service system does not correspond to a user identification information stored in the storage; and when the print job obtained is a first print job in which the owner of the print job obtained does not correspond to the user identification information stored in the storage and is obtained from the printing service system,
execute the first print job obtained to perform printing using a printing unit in a case where the second setting has been set to allow printing regardless of whether the first setting has been set to allow printing or not.

2. The printing apparatus according to claim 1, wherein when the print job is the first print job obtained from a specified printing service system, the printing includes executing the print job according to the second setting and performing printing.

3. The printing apparatus according to claim 2, wherein the at least one program further causes the at least one processor to
receive a setting from a user via a user interface, and
store the first and second settings set via the user interface and a specification of the printing service system.

4. The printing apparatus according to claim 1, wherein the at least one program further causes the at least one processor to
obtain the first setting from the printing service system, and
store the first setting obtained.

5. The printing apparatus according to claim 1, wherein the at least one program further causes the at least one processor to
receive a setting from a user via a user interface, and
when the first print setting is set not to allow printing, receive a setting of the second setting via the user interface.

6. The printing apparatus according to claim 1, wherein the storing includes, in addition to storing the user identification information of a registered user, storing user information of the printing service system associated with the user identification information in the storage, and
the printing includes, when the user information of the owner of the print job obtained is stored in the storage associated with the user identification information, determining that the owner of the print job obtained corresponds to the user identification information stored in the storage.

7. The printing apparatus according to claim 1, wherein the printing includes canceling a print job determined to not be executed according to the first setting or the second setting.

8. A printing system comprising:
a printing apparatus;
a printing service system; and
a client terminal that supplies a print job to the printing service system, wherein
the printing apparatus includes
at least one memory storing at least one program, and
at least one processor, wherein
the at least one program causes the at least one processor to:
store user identification information of a registered user in a storage,
obtain a print job including user information of an owner of the print job from the printing service system,
set a first setting indicating whether or not to allow printing by a print job in a case where an owner of the print job does not correspond to a user identification information stored in the storage;
set a second setting indicating whether or not to allow printing by the print job in a case where an owner of the print job obtained from the printing service system does not correspond to a user identification information stored in the storage; and when the print job obtained is a first print job in which the owner of the print job obtained does not correspond to the user identification information stored in the storage and is obtained from the printing service system, execute the first print job obtained to perform printing using a printing unit in a case where the second setting has been set to allow printing regardless of whether the first setting has been set to allow printing or not.

9. A non-transitory computer-readable medium storing a program, wherein, when the program is loaded and executed by a computer, the program causes the computer to execute processing, the processing including storing user identification information of a registered user in a storage, obtaining a print job including user information of an owner of the print job from a printing service system, setting a first setting indicating whether or not to allow printing by a print job in a case where an owner of the print job does not correspond to a user identification information stored in the storage:

setting a second setting indicating whether or not to allow printing by the print job in a case where an owner of the print job obtained from the printing service system does not correspond to a user identification information stored in the storage; and when the print job obtained is a first print job in which the owner of the print job obtained does not correspond to user identification information stored in the storage and is obtained from the printing service system, executing the first print job obtained to perform printing using a printing unit in a case where the second setting has been set to allow printing regardless of whether the first setting has been set to allow printing or not.

10. A control method of a printing apparatus including a storage that stores user identification information of a registered user and a controller, the control method comprising:

the controller obtaining a print job including user information of an owner of the print job from a printing service system;

the controller setting a first setting indicating whether or not to allow printing by a print job in a case where an owner of the print job does not correspond to a user identification information stored in the storage;

the controller setting a second setting indicating whether or not to allow printing by the print job in a case where an owner of the print job obtained from the printing service system does not correspond to a user identification information stored in the storage; and when the print job obtained is a first print job in which the owner of the print job obtained does not correspond to user identification information stored in the storage and is obtained from the printing service system, the controller executing the first print job obtained to perform printing using a printing unit in a case where the second setting has been set to allow printing regardless of whether the first setting has been set to allow printing or not.

* * * * *